A. SOBECK.
NUT LOCK.
APPLICATION FILED AUG. 12, 1916.
1,209,895.
Patented Dec. 26, 1916.
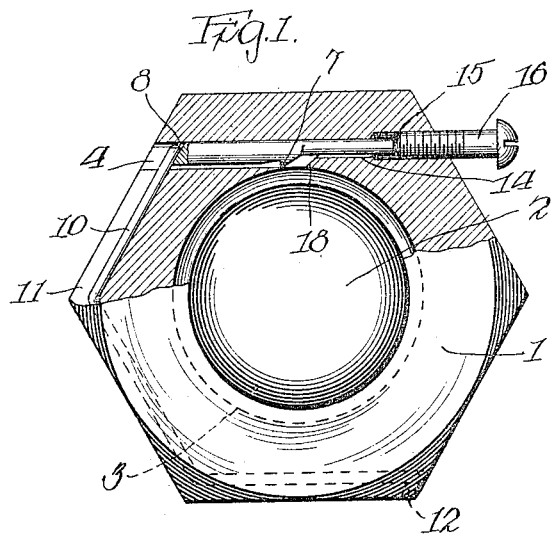
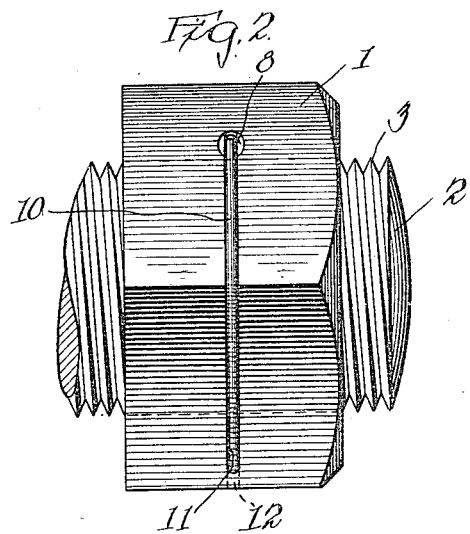
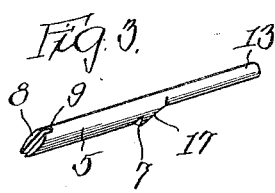
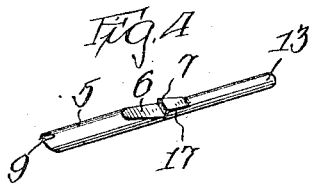
Witness:
Leo J. Dubrais.
Inventor:
August Sobeck
by Robr. Klotz, Atty.

UNITED STATES PATENT OFFICE.

AUGUST SOBECK, OF CHICAGO, ILLINOIS.

NUT-LOCK.

1,209,895. Specification of Letters Patent. Patented Dec. 26, 1916.

Application filed August 12, 1916. Serial No. 114,512.

*To all whom it may concern:*

Be it known that I, AUGUST SOBECK, a subject of the Emperor of Germany, residing at Chicago, in the county of Cook and State of Illinois, have invented certain new and useful Improvements in Nut-Locks, of which the following is a specification.

The essential object of this invention is to provide a nut-lock of the type in which an interiorly threaded nut can be locked upon the screw in such manner as to prevent rotation of the nut in one direction while permitting the nut freely to revolve in the opposite direction.

In the drawings, Figure 1 is an elevation of the invention, the nut being shown partly in section; Fig. 2 is a view looking toward the right, Fig. 1; and Figs. 3 and 4 are perspective views of the pawl by which the locking is effected.

The nut 1 is shown in the drawings by way of example as being of the ordinary hexagonal form and is fitted upon the screw 2 threaded at 3. The nut is recessed at 4 and the pawl 5, which is notched at 6 and toothed at 7, is slidably mounted within said recess so as to be movable tangentially of screw 2. The end 8 of the pawl is beveled and said beveled end is slotted at 9, the slot 9 being wide enough ordinarily to receive the free end of the spring 10. Said spring 10 is received in the recess or cavity 11 provided in the nut 1, and one end 12 of said spring 10 is bent into hook-like form as indicated in Fig. 1. The spring 10 is so formed that it tends normally to push the sliding pawl 5 toward the right in Fig. 1. The stem 13 which is secured to the pawl 5, but which is of less diameter than the main body of the pawl, and has an axis eccentric to that of the pawl moves within the perforation 14 which is in alinement with but eccentric to the perforation 4, said perforation 14 being in communication with a screw-threaded tap-hole 15, which tap-hole 15 receives the screw 16. As the screw 16 is rotated in one direction it will travel toward the left, Fig. 1, and force the pawl in the same direction. As the pawl 5 thus moves the tooth 7 will be carried out of range of the threads 3; but when the screw is rotated in the opposite direction as far as or beyond the position indicated in Fig. 1, the tooth 7 will normally rest upon the threads 3. The spring 10 will at all times push the pawl toward the screw 16 and will keep the right-hand end of the stem 13 bearing upon the left-hand end of the screw 16.

Assuming that the screw 2 is fixed and that the nut 1 is intended to be revolved therearound, and assuming, moreover, that the parts are in the position depicted in Fig. 1, when the nut 1 is revolved in the clockwise direction the tooth 7 will ride over the threads 3 because the beveled face 17 of the tooth 7 will offer no resistance; on the contrary, if an effort be made to rotate the nut in a counter-clockwise direction, the sharp edge of the tooth 7 will lock with the threads 3 and will prevent any appreciable movement of the nut 1. Sometimes it will be desirable, of course, to permit the nut 1 to rotate in the counter-clockwise direction and to be removed from the screw 2, and, when it is desired thus to unlock the nut 1, the screw 16 is turned and the locking-pawl 5 forced toward the left a sufficient distance to carry the sharp edge tooth 7 beyond the range of the threads 3. The right-hand wall of the perforation 4 is preferably beveled at 18 so as to correspond with the beveling 17 on the tooth 7, and in order to allow the necessary play required by the parts the perforation 4 is slightly greater in diameter than the main body of the pawl 5. The perforation 14 is slightly greater in diameter than the stem 13, although the perforation 4 may be of substantially the same diameter as the pawl 5 is at the point where said pawl 5 is toothed at 7. The eccentricity of the stem of the pawl with respect to the body portion thereof prevents rotation of the pawl within its bearing.

I claim as my invention:

1. A device of the character described, comprising a nut having two registering perforations therein of unequal diameters, a pawl having portions of unequal diameters received within said perforations, a tooth formed upon that part of the pawl having the greater diameter, and means coöperating with that part of the pawl having the lesser diameter and adapted to move said pawl to inoperative position.

2. A device of the character described, comprising a nut provided with two registering perforations, a pawl having a toothed body portion received within one of said perforations and a stem received within the other of said perforations, a spring adapted normally to push said pawl in one direction and retain the same in operative position, and means adapted to engage said stem and force said pawl against the resistance of said spring, thereby to move said pawl to inoperative position.

3. A device of the character described, comprising a nut having two registering perforations therein, a pawl, the body portion of which is received within one of said perforations, a stem upon said pawl received within the other of said perforations, means coöperating with the stem adapted to force the pawl to inoperative position; a spring coöperating with the body portion and tending to force the pawl to operating position, a tooth carried upon the body portion of the pawl, the perforation which receives said body portion being substantially the same diameter as said pawl at the point where it is toothed and being slightly greater in diameter than the remainder of the body portion of the pawl; and the perforation which receives said stem being slightly greater in diameter than said stem.

4. The combination with a nut and its screw, of a toothed pawl mounted within the nut for movement therein tangentially of the screw and toward and from the same, resilient means pressing the pawl in one direction, a stem on the pawl, and a device adjustably mounted in the nut and engaging the stem to limit movement of the pawl in said one direction, said stem having its axis eccentric to that of the pawl.

In testimony whereof I affix my signature.

AUGUST SOBECK.

Copies of this patent may be obtained for five cents each, by addressing the "Commissioner of Patents, Washington, D. C."